United States Patent
Kawai et al.

(10) Patent No.: US 8,523,521 B2
(45) Date of Patent: Sep. 3, 2013

(54) WIND TURBINE GENERATOR

(75) Inventors: Masahiro Kawai, Tokyo (JP); Seita Seki, Tokyo (JP); Yasuhiro Obase, Tokyo (JP); Hauke Karstens, London (GB)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/345,788

(22) Filed: Jan. 9, 2012

(65) Prior Publication Data

US 2012/0114487 A1 May 10, 2012

Related U.S. Application Data

(60) Division of application No. 12/977,339, filed on Dec. 23, 2010, now abandoned, which is a continuation of application No. PCT/JP2010/064693, filed on Aug. 30, 2010.

(51) Int. Cl.
*F03D 11/00* (2006.01)
*F03D 7/04* (2006.01)

(52) U.S. Cl.
USPC ............... 416/1; 416/155; 416/205

(58) Field of Classification Search
USPC ............ 415/130; 416/132 B, 1, 155, 156, 416/205, 209
See application file for complete search history.

(56) References Cited

U.S. PATENT DOCUMENTS

| | | | |
|---|---|---|---|
| 6,783,326 B2 | 8/2004 | Weitkamp et al. | |
| 6,939,103 B2 | 9/2005 | Wobben | |
| 7,513,742 B2 | 4/2009 | Rogall et al. | |
| 7,717,673 B2 | 5/2010 | Menke | |
| 2010/0083516 A1 | 4/2010 | Mashue et al. | |
| 2010/0135808 A1 | 6/2010 | Wiebrock et al. | |
| 2010/0139063 A1 * | 6/2010 | Goodwin | 29/23.51 |
| 2010/0143136 A1 | 6/2010 | Daniels et al. | |

FOREIGN PATENT DOCUMENTS

| | | |
|---|---|---|
| JP | 2007138751 A1 | 6/2007 |
| JP | 2009516118 A1 | 4/2009 |
| WO | WO 2010017820 A2 * | 2/2010 |

OTHER PUBLICATIONS

ISR for PCT/JP2010/064693 dated Sep. 28, 2010.

* cited by examiner

*Primary Examiner* — Edward Look
*Assistant Examiner* — Jesse Prager
(74) *Attorney, Agent, or Firm* — Kanesaka Berner & Partners, LLP

(57) ABSTRACT

Provided is a wind turbine generator including an electric pitch-control device that efficiently utilizes the entire circumferential teeth of a ring gear of a wind turbine blade so as to eliminate the need for work at high elevation using a crane or the like even when the teeth of the ring gear are partly broken. A wind turbine generator having an electric pitch-control device that performs pitch-angle control by using a motor to drive a pinion gear that meshes with a ring gear of a wind turbine blade includes a plurality of pinion-driving-mechanism securing supporters or a fixing/releasing switching part as a meshing-region changing mechanism that changes a pitch-angle-control meshing region of the ring gear that meshes with the pinion gear during the pitch-angle control.

8 Claims, 6 Drawing Sheets

WIND TURBINE GENERATOR

CROSS REFERENCE TO RELATED APPLICATIONS

This is a divisional application of Ser. No. 12/977,339 filed Dec. 23, 2010, which is a continuation of International Application PCT/JP/2010/064693, with an international filing date of Aug. 30, 2010. The above-listed applications are hereby incorporated by reference herein in their entirety.

TECHNICAL FIELD

The present invention relates to wind turbine generators equipped with electric pitch-control devices that control the pitch angles of wind turbine blades.

BACKGROUND ART

In a wind turbine generator, a hub equipped with wind turbine blades rotates in response to wind energy, and a gear box increases the speed of this rotation so as to drive a generator, whereby power is generated.

The aforementioned hub is attached to an end of a yawable nacelle that is set on top of a wind-turbine tower, and is supported in a rotatable manner about a rotation axis extending substantially in the horizontal direction.

In order to control the output power in accordance with the wind speed, such a wind turbine generator performs pitch control for changing the angles of the wind turbine blades.

Known examples of pitch-control devices in the related art include a hydraulic pitch-control device that utilizes hydraulic pressure and an electric pitch-control device that uses a motor (for example, see Patent Literature 1).

CITATION LIST

Patent Literature

{PTL 1} U.S. Pat. No. 7,717,673

SUMMARY OF INVENTION

Technical Problem

The electric pitch-control device in the related art includes a motor serving as a driving source and a pinion gear that rotates in response to a driving force of the motor via a speed-reduction gear, and is securely supported by a hub. On the other hand, the wind turbine blades each have a ring gear that meshes with the pinion gear, and the base end (blade root) thereof is attached to the rotor hub via a bearing. Therefore, since the entire wind turbine blade rotates integrally with the ring gear meshed with the pinion gear in accordance with the amount of rotation of the pinion gear, the pitch angle of the wind turbine blade can be changed to a desired value.

Regarding such a pitch-control mechanism, if the teeth of the ring gear break, for example, the entire wind turbine blade needs to be replaced. In this case, work at a high elevation using a machine, such as a crane, is necessary.

Such work at high elevation is problematic in that it not only requires an enormous cost for the logistics of the crane, but also involves many hours of labor. In particular, with regard to a wind turbine generator installed offshore or in a mountainous region, the machine, such as the crane, cannot easily access these places in many cases; thus, a loss caused by shutdown for a long time is also a significant problem in addition to the high cost required for the work at high elevation.

On the other hand, after performing a verification test on the operation of an electric pitch-control mechanism, the present inventors have discovered that the frequency of pitch angles is concentrated in a certain region and that there is no movement by 95° or greater. Specifically, regardless of the fact that the teeth of the ring gear are provided over the entire circumference (360°) of the wind turbine blade, the actually-used meshing region of the ring gear that meshes with the pinion gear during pitch-angle control covers an angular range of only about 95°, which is approximately one quarter of the circumference.

The present invention has been made to solve the aforementioned problems, and an object thereof is to provide a wind turbine generator including an electric pitch-control device that efficiently utilizes the teeth of a ring gear provided over the entire circumference of a wind turbine blade so as to reduce the frequency of work at a high elevation using a crane or the like even when the teeth of the ring gear break.

Solution to Problem

In order to solve the aforementioned problems, the present invention employs the following solutions.

In a wind turbine generator of the present invention having an electric pitch-control device that performs pitch-angle control by using a motor to drive a pinion gear that meshes with a ring gear of a wind turbine blade, the wind turbine generator includes a meshing-region changing mechanism that changes a pitch-angle-control meshing region of the ring gear that meshes with the pinion gear that is rotatable and securely supported by a rotor hub, during the pitch-angle control.

With this wind turbine generator of the present invention, because the meshing-region changing mechanism that changes the pitch-angle-control meshing region of the ring gear that meshes with the pinion gear, which is rotatable and securely supported by the rotor hub, during the pitch-angle control is provided, if the teeth of the ring gear break, the meshing region of the ring gear, normally formed over a 360° range, relative to the pinion gear that meshes therewith can be changed, whereby the pitch-angle-control meshing region of the ring gear can be moved to an area where there is no breakage. Specifically, even if the teeth of the ring gear break, the meshing-region changing mechanism can change the pitch-angle-control meshing region, which only uses about a 95° range, by moving it in the circumferential direction to an area where there is no breakage, whereby pitch-angle control can be performed without having to replace the ring gear.

Furthermore, by changing the meshing region relative to the pinion gear before the ring gear breaks, the design life of the ring gear can be shortened.

In the above-described invention, it is preferable that the meshing-region changing mechanism include selectable securing supporters for the electric pitch-control device, the securing supporters being provided in a rotor hub at multiple locations in a circumferential direction of the ring gear. Consequently, by positionally shifting the pinion gear securely supported by the rotor hub in the circumferential direction, the pitch-angle-control meshing region of the ring gear can be moved to an area where there is no breakage.

In this case, it is desirable that the pinion-gear securing supporters be provided in advance at two to four locations at an equal pitch in the circumferential direction.

In the above-described invention, it is preferable that the meshing-region changing mechanism include a fixing/releasing switching part provided between the ring gear and the wind turbine blade. Consequently, if the teeth of the ring gear break, the fixing/releasing switching part releases the fixed state between the ring gear and the wind turbine blade so that the ring gear itself can be rotated in the circumferential direction, whereby the pitch-angle-control meshing region that meshes with the fixed pinion gear can be moved to an area where there is no breakage.

In this case, the fixing/releasing switching part is, for example, a structure that fixes the ring gear to the wind turbine blade by using a plurality of bolts and nuts, and the ring gear can be rotated relative to the wind turbine blade by rotating the pinion gear in a state where the fixed ring gear is released.

Since the wind turbine blade is normally composed of fiber-reinforced plastics (FRP), it is desirable that a metallic coupling ring be provided in the wind turbine blade to which the ring gear is fixed using the bolts and nuts.

Advantageous Effects of Invention

With the wind turbine generator of the present invention described above, if the teeth of the ring gear in the electric pitch-control device break, the meshing-region changing mechanism can change the pitch-angle-control meshing region by moving it in the circumferential direction, whereby pitch-angle control can be performed using an area having no broken teeth without having to replace the ring gear by working at a high elevation using a machine such as a crane. Specifically, based on the knowledge that the pitch-angle-control meshing region is in about a 95° range, the ring gear provided over the entire circumference of the wind turbine blade is efficiently utilized so that the electric pitch-control device can be restored at low cost within a short time, thereby reducing the cost required for the restoration and the loss caused by shutdown of the wind turbine generator.

Furthermore, since the meshing region relative to the pinion gear can be changed before the ring gear breaks, the design life of the ring gear can consequently be shortened so as to allow for cost reduction.

DESCRIPTION OF EMBODIMENTS

An embodiment of a wind turbine generator according to the present invention will be described below with reference to the drawings.

Figure 6:
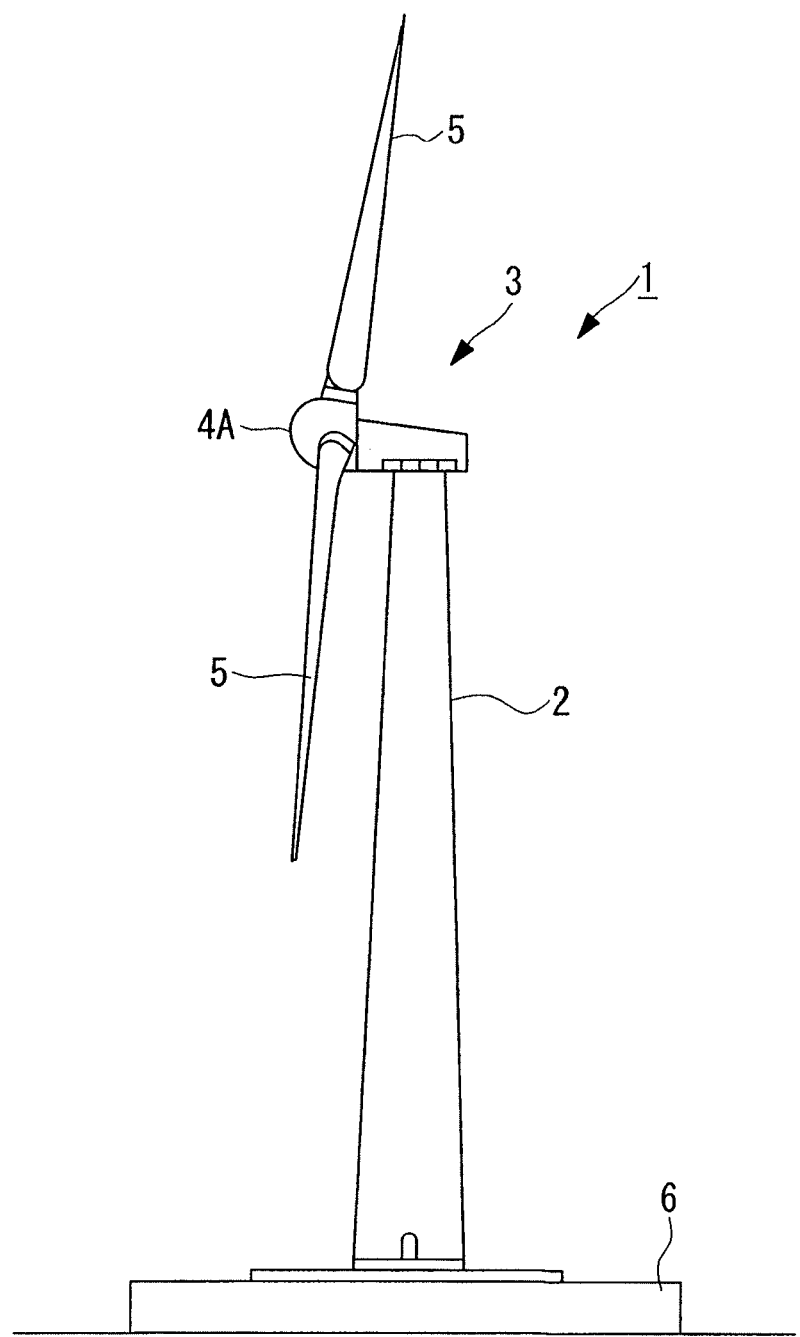
FIG. 6 is a side view schematically illustrating a wind turbine generator according to the present invention.

A wind turbine generator 1 shown in FIG. 6 includes a wind-turbine tower (referred to as "tower" hereinafter) 2 erected upright on a foundation 6, a nacelle 3 set on an upper end of the tower 2, and a hub 4A provided at a front end of the nacelle 3 and supported in a rotatable manner around a substantially horizontal rotation axis.

Multiple (e.g., three) wind turbine blades 5 are attached to the hub 4A in a radiating pattern around the rotation axis thereof. Thus, the force of wind striking the wind turbine blades 5 in the rotation-axis direction of the hub 4A is converted to power that rotates the hub 4A around the rotation axis thereof.

Figure 1:
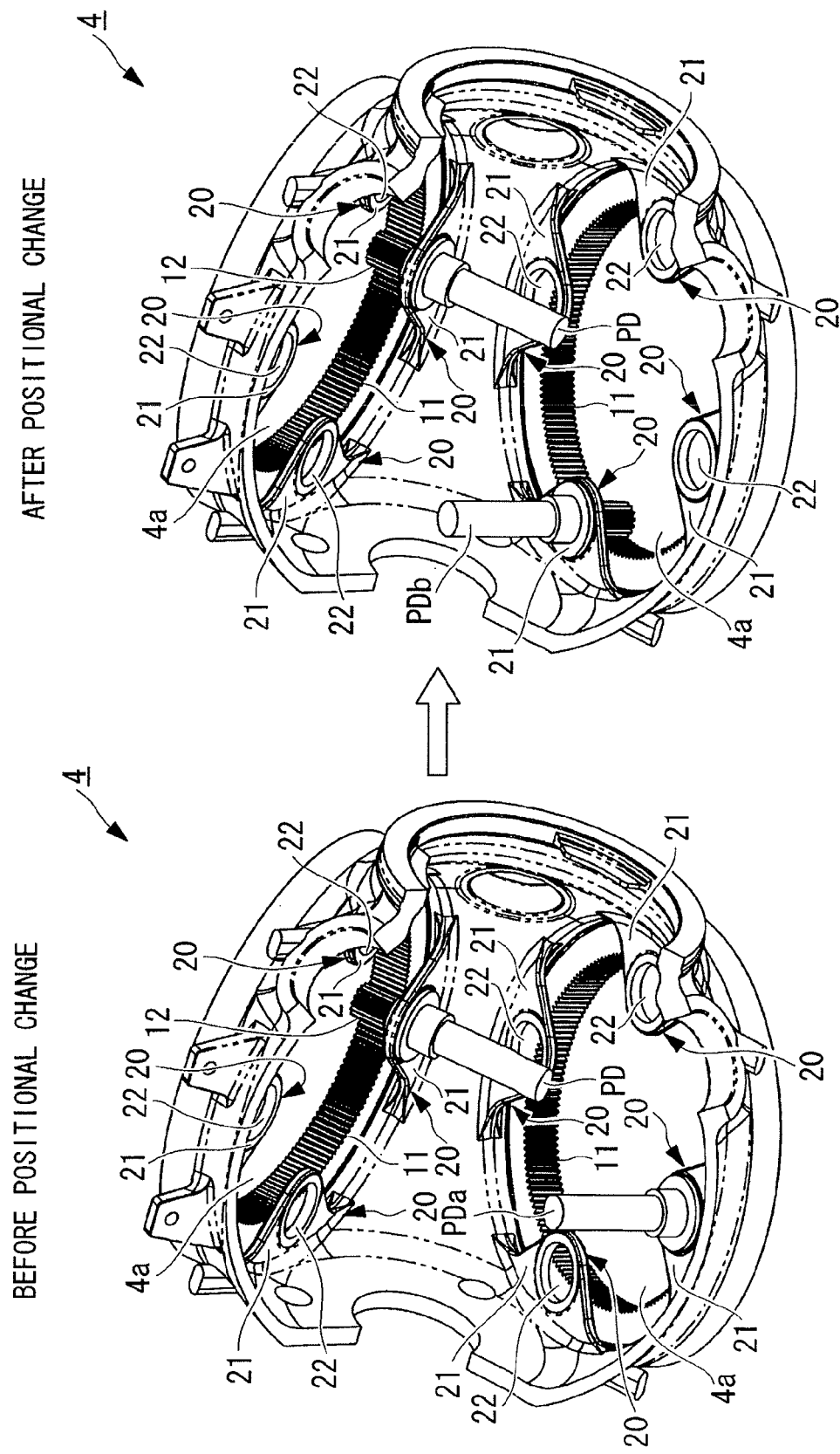
FIG. 1 is a perspective view illustrating a configuration example of a rotor hub equipped with a meshing-region changing mechanism of an electric pitch-control device, in a first embodiment of a wind turbine generator according to the present invention.
Figure 2:
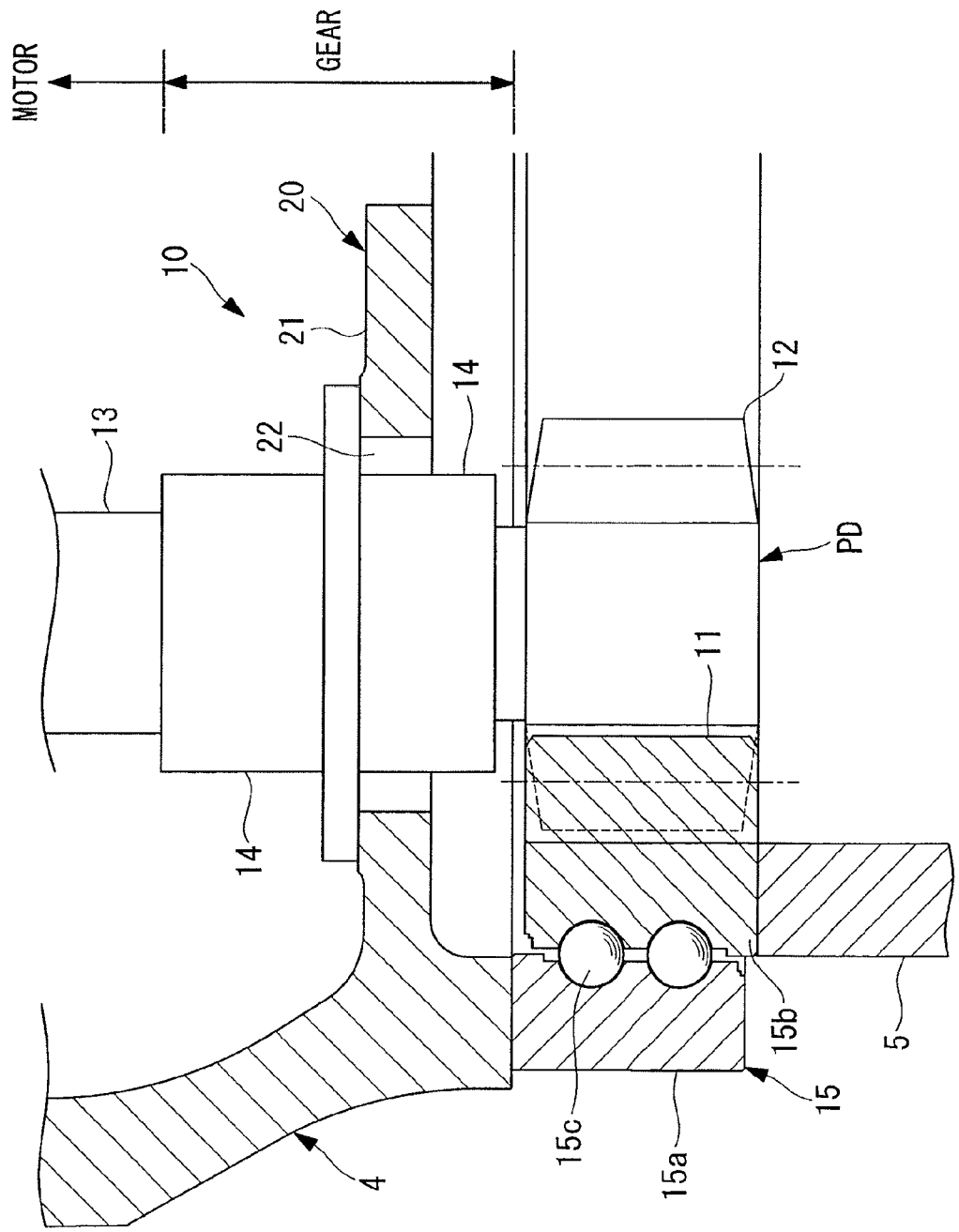
FIG. 2 is a sectional view illustrating a structure surrounding a pinion gear, which is securely supported by the rotor hub, of the electric pitch-control device.

In order to control the output power in accordance with the wind speed, the aforementioned wind turbine blades 5 are each equipped with an electric pitch-control device 10 that controls the pitch angle of the wind turbine blade 5, as shown in FIGS. 1 and 2. Each electric pitch-control device 10 is securely supported by a rotor hub and is configured to use an electric motor 13 to rotationally drive a pinion gear 12 that meshes with a ring gear 11 of the wind turbine blade 5 in response to a command from a control device (not shown).

The electric pitch-control device 10 is normally equipped with a speed-reduction gear 14 interposed between the electric motor 13 and the pinion gear 12. In the following description, the electric motor 13, the speed-reduction gear 14, and the pinion gear 12 will collectively be referred to as "pinion-driving mechanism PD".

Furthermore, in the wind turbine shown in the drawings, each wind turbine blade 5 is supported in a rotatable manner relative to a rotor hub 4 via a corresponding bearing 15. In this case, each bearing 15 is a rolling bearing configured such that multiple rolling objects 15c are interposed between an outer ring 15a and an inner ring 15b, and the outer ring 15a serves as a fixed side that is coupled to the rotor hub 4. In contrast, the inner ring 15b is coupled to a base end (blade root) of the wind turbine blade 5 that rotates in accordance with pitch-angle control, and the ring gear 11 is provided on the inner surface of the inner ring 15b.

Therefore, because the wind turbine blade 5 and the inner ring 15b rotate together with the ring gear 11, which meshes with the pinion gear 12, relative to the rotor hub 4 and the outer ring 15a serving as the fixed side, pitch-angle control for changing the pitch angle of the wind turbine blade 5 is possible. Specifically, when the pinion gear 12 of the pinion-driving mechanism PD securely supported by the rotor hub 4 is rotated by being driven by the electric motor 13, the ring gear 11 that meshes with the pinion gear 12 rotates integrally with the inner ring 15b of the bearing 15 and the wind turbine blade 5, whereby the pitch angle of the wind turbine blade 5 can be changed relative to the rotor hub 4.

In this embodiment, the electric pitch-control device 10 of the wind turbine generator 1 described above is provided with a meshing-region changing mechanism that changes a pitch-angle-control meshing region of the ring gear 11 that meshes with the pinion gear 12 of the pinion-driving mechanism PD, securely supported by the rotor hub 4, during pitch-angle control.

The meshing-region changing mechanism in this embodiment includes selectable pinion-driving-mechanism securing supporters 20 provided in advance at multiple locations in the rotor hub 4. In the configuration example shown in FIG. 1, four pinion-driving-mechanism securing supporters 20 are provided at positions where they protrude inward of a corresponding blade mounting hole 4a provided in the rotor hub 4.

Specifically, the aforementioned pinion-driving-mechanism securing supporters 20 are provided at four locations set apart by a 90° pitch in the circumferential direction of the ring gear 11, but only one of them is appropriately selected and actually used for securely supporting the pinion-driving mechanism PD. Therefore, the remaining three act as pinion-gear securing supporters 20 in which the pinion-driving mechanism PD is not set.

The pinion-gear securing supporters 20 are not limited to those provided at the aforementioned four locations, but may be provided in advance at, for example, two locations set apart by a 180° pitch in the circumferential direction or three locations set apart by a 120° pitch.

Although each pinion-driving-mechanism securing supporter 20 shown in the drawings is formed by providing a supporting surface 21 that protrudes into the corresponding blade mounting hole 4a from the rotor hub 4 and then opening a mounting hole 22 in this supporting surface 21, the configuration thereof is not limited.

As an alternative configuration example, for example, the mounting holes 22 may be formed by using a rib that extends across the blade mounting hole 4a of the rotor hub 4 so as to reinforce the area surrounding the blade mounting hole 4a.

By providing the multiple pinion-driving-mechanism securing supporters 20 in advance in this manner, if the teeth of the ring gear 11 are partly broken or are predicted to break, another pinion-driving-mechanism securing supporter 20 is used so that the pinion gear 12 securely supported by the rotor hub 4 is positionally shifted in the circumferential direction of the ring gear 11. For example, in the example showing a positional change in FIG. 1, a pinion-driving mechanism PDa before the positional change is shifted by 90° in the circumferential direction of the ring gear 11 so as to become a pinion-driving mechanism PDb after the positional change.

After changing the position of the pinion-driving mechanism PD, calibration for zero-point adjustment of an encoder is performed.

Figure 3:
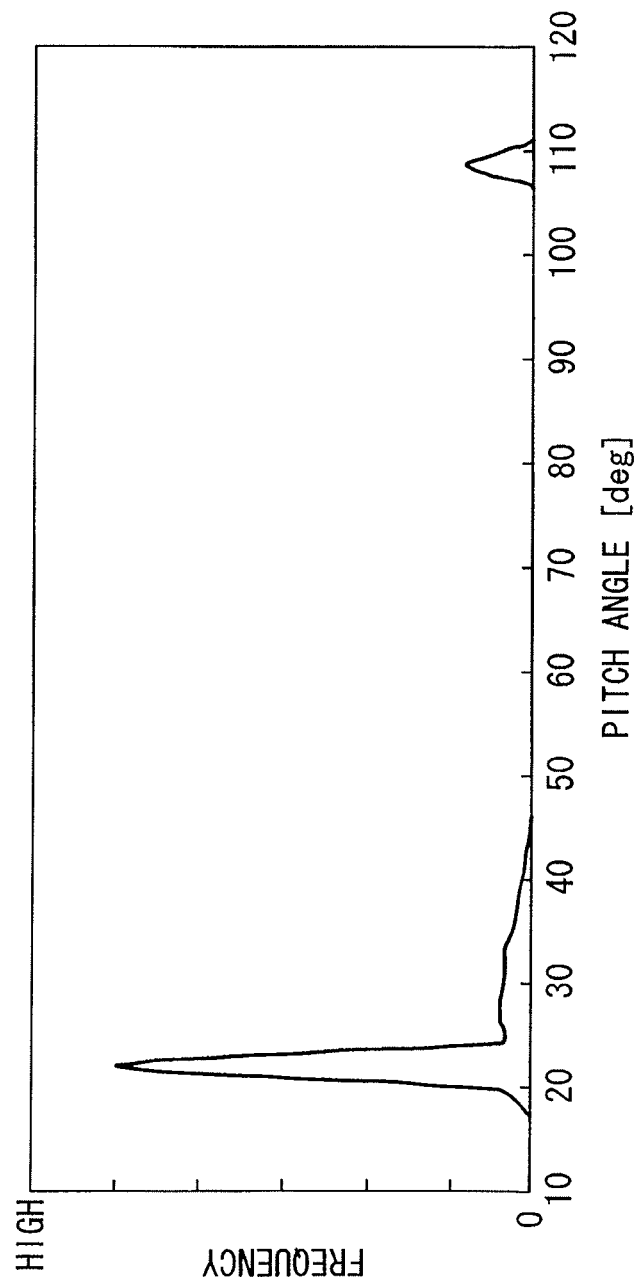
FIG. 3 illustrates the frequency of pitch angles used when the pinion gear and a ring gear mesh with each other during pitch-angle control in the electric pitch-control device.

Specifically, as shown in FIG. 3, an area of the ring gear 11 where the teeth thereof can possibly break is substantially in a pitch-angle-control meshing region of about 95° when pitch-angle control is performed by meshing the ring gear 11 with the pinion gear 12. In FIG. 3, the abscissa denotes the pitch angle, whereas the ordinate denotes the frequency. Since pitch-angle control during the operation of the wind turbine generator 1 is frequently performed when the pitch angle is substantially between 15° and 45° and substantially near 110°, the ring gear 11 is actually used in a region of about 95° (between 15° and 110°).

Therefore, a new pitch-angle-control meshing region can be set in an area where there is no breakage in the ring gear 11 by moving by 90° from the current pitch-angle-control meshing region to the new region, thereby allowing for pitch-angle control without having to replace the ring gear 11.

If the teeth of the ring gear 11 break near an end of the pitch-angle-control meshing region, the pinion-driving-mechanism securing supporter 20 located on the opposite side by 90° or 180° may be used so that the broken teeth are not included in the new pitch-angle-control meshing region.

Figure 4:
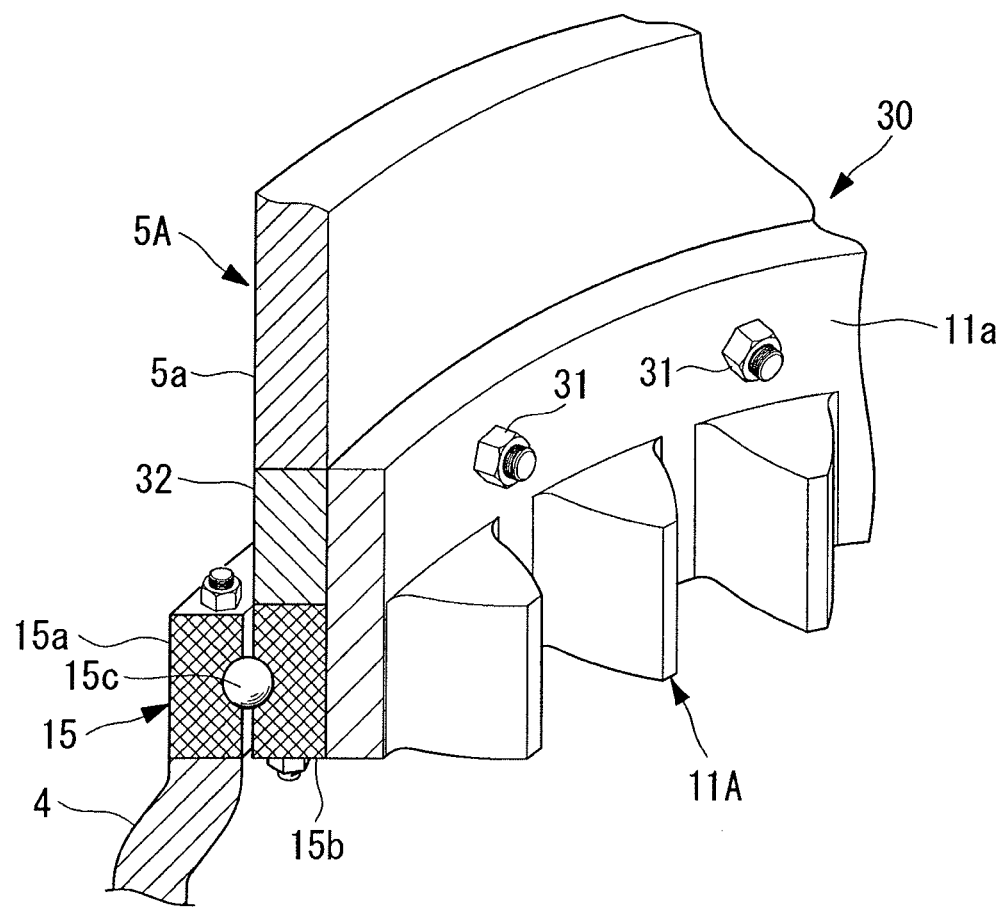
FIG. 4 is a perspective sectional view of a relevant part illustrating a configuration example of a wind turbine blade equipped with a meshing-region changing mechanism of an electric pitch-control device, in a second embodiment of a wind turbine generator according to the present invention.

Next, a configuration example of a wind turbine blade 5 equipped with a meshing-region changing mechanism of an electric pitch-control device 10 will be described as a second embodiment of a wind turbine generator 1 according to the present invention with reference to FIGS. 4 and 5. Components similar to those in the above-described embodiment are given the same reference numerals, and detailed descriptions thereof will be omitted.

The meshing-region changing mechanism in this embodiment is defined by fixing/releasing switching part 30 provided between a ring gear and a wind turbine blade.

The fixing/releasing switching part 30 shown in the drawings is, for example, a structure that fixes a ring gear 11A to a wind turbine blade 5A by using a plurality of bolts and nuts 31.

The ring gear 11A in this case has a flange portion 11a formed at an upper end thereof. The flange portion 11a is used for fixing the ring gear 11A to the wind turbine blade 5A using the bolts and nuts 31.

On the other hand, the wind turbine blade 5A has a configuration in which a metallic coupling ring 32 is interposed between a wind turbine blade body 5a composed of FRP and an inner ring 15b. The coupling ring 32 is provided at a position aligned with the flange portion 11a of the ring gear 11A, and the ring gear 11A is fixed to this coupling ring 32, which is a metallic component, using the bolts and nuts 31.

Figure 5:
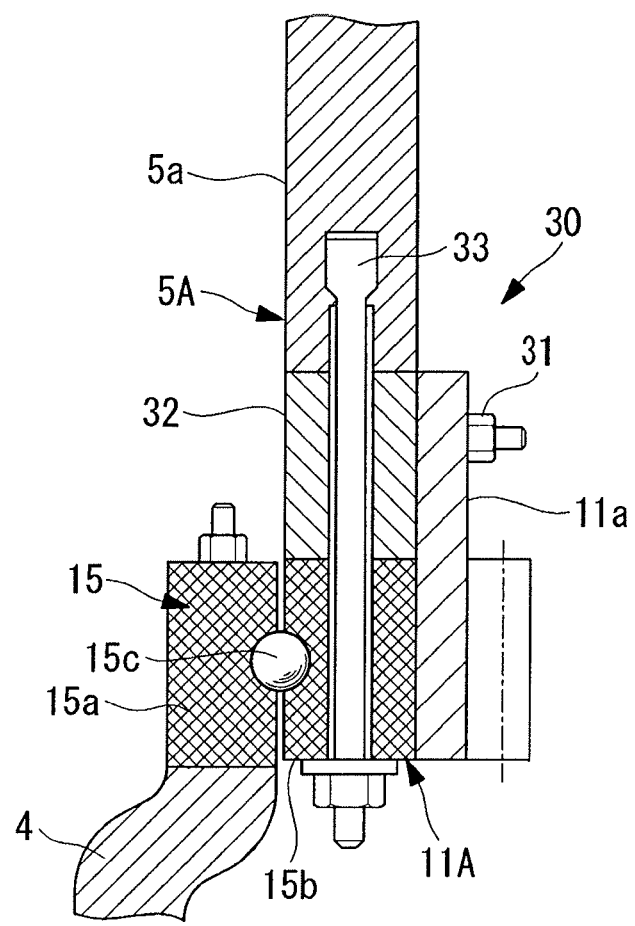
FIG. 5 is a sectional view illustrating an example of a coupling structure for an inner ring of a bearing, a coupling ring, and a wind turbine blade body in FIG. 4.

For example, as shown in FIG. 5, the inner ring 15b, the coupling ring 32, and the wind turbine blade body 5a are coupled to each other using multiple bolts and nuts 33 embedded in the wind turbine blade body 5a.

With such a configuration, the ring gear 11A can be rotated relative to the wind turbine blade 5A by rotating a pinion gear 12 in a state where the fixed ring gear 11A is released. Specifically, by rotating the pinion gear 12, fixed to the rotor hub 4, after removing the bolts and nuts 31, the ring gear 11A now in a free state rotates relative to the wind turbine blade 5A so that its meshing position relative to the pinion gear 12 is shifted, whereby a part of the ring gear 11A where its teeth are broken can be moved outside the pitch-angle-control meshing region. In this case, after rotating the ring gear 11A and fixing it to the wind turbine blade 5A by attaching the bolts and nuts 31 thereto, calibration for zero-point adjustment of an encoder is performed.

The contact surface between the ring gear 11A and the coupling ring 32 and between the ring gear 11A and the inner ring 15b may be surface-treated so as to reduce friction, or may be provided with a lubrication groove and be supplied with oil for rotation, thereby allowing for smooth rotation of the ring gear 11A.

In other words, because the bolts and nuts 31 of the fixing/releasing switching part are provided, the fixed state between the ring gear 11A and the wind turbine blade 5A can be released by simply removing the bolts and nuts 31. Accordingly, by rotating the ring gear 11A in the circumferential direction, the pitch-angle-control meshing region that meshes with the fixed pinion gear 12 can be moved to an area where there is no breakage.

The aforementioned coupling ring 32 is a metallic component provided in the wind turbine blade 5A since there is concern, in terms of strength, with regard to the ring gear 11A being fixed to the wind turbine blade body 5a composed of FRP using the bolts and nuts 31.

Accordingly, with the wind turbine generator 1 of the embodiments described above, if the teeth of the ring gear 11 or 11A are broken, are predicted to break, or are approaching the end of a predetermined design life, the meshing-region changing mechanism can change the pitch-angle-control meshing region by moving it in the circumferential direction. Consequently, without having to replace the ring gear 11 or 11A, which involves work at high elevation using a machine such as a crane, pitch-angle control can be performed using an area where there are no broken teeth.

Specifically, by efficiently utilizing the teeth of the ring gear 11 or 11A provided over the entire circumference) (360°) of the wind turbine blade 5 or 5A, the wind turbine generator 1 can resume its operation at low cost within a short time, thereby reducing a loss caused by shutdown.

Furthermore, if the meshing position of the ring gear 11 or 11A is to be changed before it breaks, the meshing position may be changed when breakage is predicted so that immediate measures can be taken by a simple process, thereby minimizing the length of a shutdown period.

Furthermore, by changing the meshing position of the ring gear 11 or 11A before it breaks, the design life of the ring gear 11 or 11A can be shortened so as to allow for cost reduction. Specifically, by spreading out the areas that mesh with the pinion gear 12, the time during which the ring gear 11 or 11A meshes with the pinion gear 12 becomes shorter so that the design life of the ring gear 11 or 11A can be shortened by half or less, thereby allowing for cost reduction.

The present invention is not limited to the above-described embodiments, and modifications, such as forming a gear in an outer ring of a bearing and meshing the gear with a pinion gear, or fixing a ring gear directly to an inner ring of the bearing without using a coupling ring, are permissible where appropriate so long as they do not depart from the spirit of the invention.

The invention claimed is:

1. A wind turbine generator, comprising:
   a rotor hub;
   a wind turbine blade;
   a bearing including an outer ring and an inner ring, the outer ring being coupled to the rotor hub, the inner ring being coupled to the wind turbine blade;
   a ring gear provided on the inner surface of the inner ring;
   a motor;
   a pinion gear that meshes with the ring gear;
   an electric pitch-control device configured to perform pitch-angle control by using the motor to drive the pinion gear; and
   a meshing-region changing mechanism configured to change a pitch-angle-control meshing region of the ring gear that meshes with the pinion gear during the pitch-angle control;
   wherein the meshing-region changing mechanism comprises a fixing/releasing switching part that switches between a fixed state and a released state, the outer surface of the ring gear being fixed to the inner surface of the inner ring in the fixed state, the outer surface of the ring gear being released from the inner surface of the inner ring in the released state.

2. The wind turbine generator of claim 1, wherein the ring gear has three or four meshing regions defined thereon.

3. The wind turbine generator of claim 2, wherein each of the three or four meshing regions occupies less than a 95-degree range of the ring gear.

4. A method of mounting a pitch-control device in a wind turbine generator, the wind turbine generator having a rotor hub, a wind turbine blade, a bearing including an outer ring coupled to the rotor hub and an inner ring coupled to the wind turbine blade, a ring gear provided on the inner surface of the inner ring, a motor, and a pinion gear that meshes with the ring gear of a wind turbine blade, the pitch-control device being configured to perform pitch-angle control by using the motor to drive the pinion gear, the method comprising:
   defining three or four pitch-angle-control meshing regions on the ring gear;
   releasing the outer surface of the ring gear from the inner surface of the inner ring;
   meshing the pinion gear with an unused one of the three or four pitch-angle-control meshing regions which is different from a currently used pitch-angle-control meshing region after teeth of the currently used pitch-angle-control meshing region break;
   fixing the outer surface of the ring gear to the inner surface of the inner ring;
   performing calibration for the pitch-control device after the meshing.

5. The method of claim 4, wherein each one of the three or four pitch-angle-control meshing regions occupies less than a 95-degree range of the ring gear.

6. The method of claim 4, wherein the wind turbine generator comprises three or four securing supporters corresponding to the three or four pitch-angle-control meshing regions, respectively, and the pitch-control device is mounted on one of the three or four securing supporters corresponding to the currently used pitch-angle-control meshing region, the meshing further comprises:
   removing the pitch-control device from the one of the three or four securing supporters; and
   mounting the pitch-control device to another one of the three or four securing supporters corresponding to the unused one of the three or four pitch-angle-control meshing regions.

7. The wind turbine generator of claim 1, wherein the wind turbine generator is configured such that the pitch-angle-control meshing region is changed solely via the electric pitch-control device.

8. The method of claim 4, wherein the action of meshing the pinion gear is accomplished solely via the pitch-control device.

* * * * *